March 9, 1926.
W. G. G. WEIDINGER
AEROPLANE
Filed Jan. 28, 1925
3 Sheets-Sheet 1

1,575,882

March 9, 1926. 1,575,882
W. G. G. WEIDINGER
AEROPLANE
Filed Jan. 28, 1925 3 Sheets-Sheet 2

Patented Mar. 9, 1926.

1,575,882

UNITED STATES PATENT OFFICE.

WILLIAM G. G. WEIDINGER, OF CHICAGO, ILLINOIS.

AEROPLANE.

Application filed January 28, 1925. Serial No. 5,239.

*To all whom it may concern:*

Be it known that I, WILLIAM G. G. WEIDINGER, a citizen of the United States, residing at Chicago, in the county of Cook and State of Illinois, have invented certain new and useful Improvements in Aeroplanes, of which the following is a specification.

This invention relates to improvements in aeroplanes and its object is to provide an aeroplane of the streamline type that is built to attain maximum speed, that at the same time is strong and durable and that is efficient in general use.

With the foregoing and other objects in view the invention consists in the combination and arrangement of parts to be hereinafter fully described, pointed out in the appended claims and illustrated in the accompanying drawings which form a part of this application and in which—

Fig. 6 is an enlarged fragmentary sectional view.

Like reference characters denote corresponding parts throughout the several views.

Figure 1:
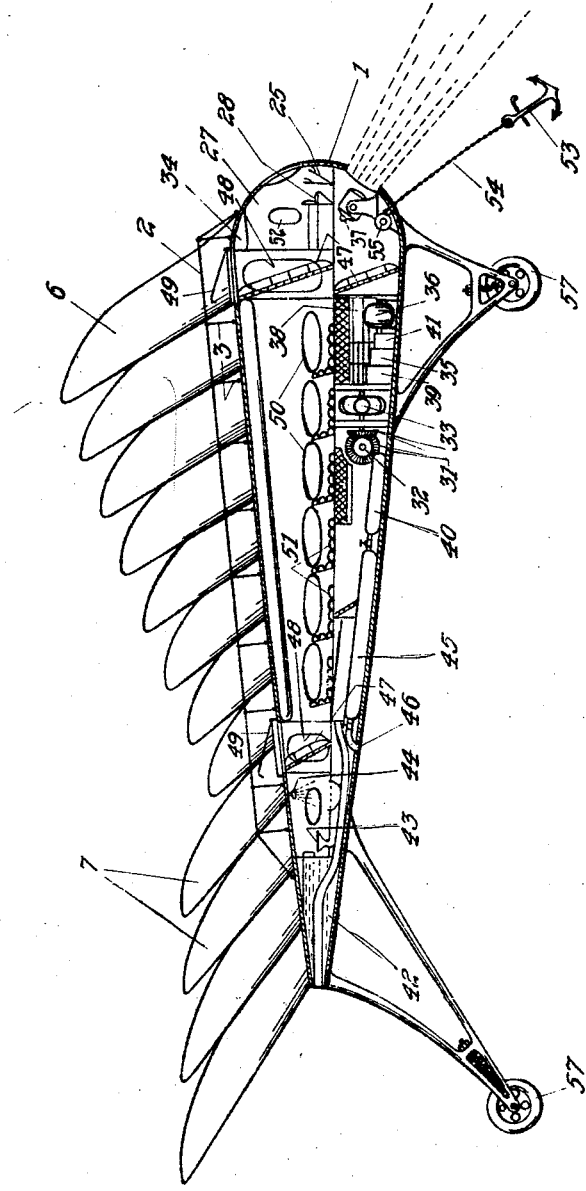
Fig. 1 is a longitudinal sectional view through the machine.
Figure 2:
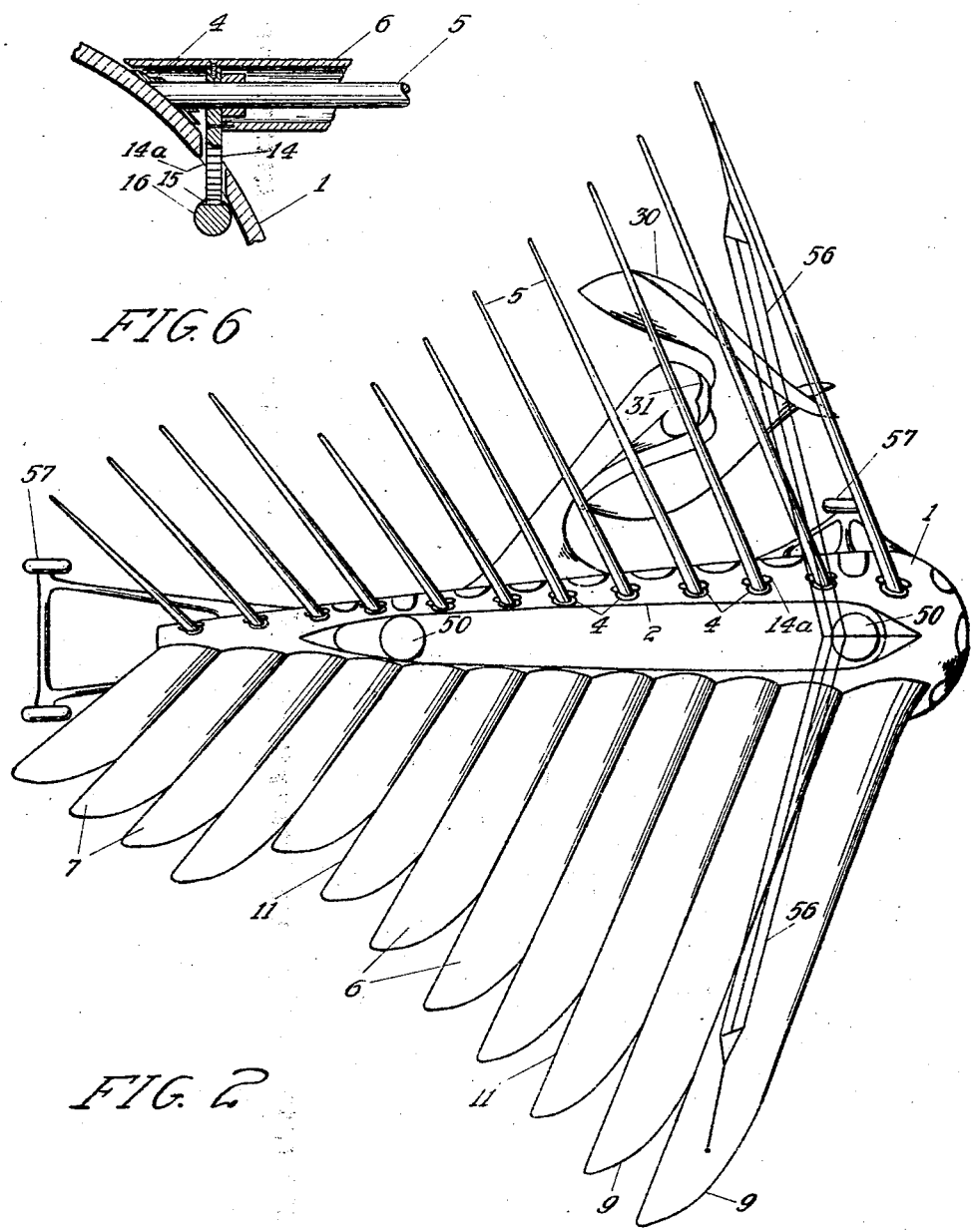
Fig. 2 is a top plan view of the machine, some of the wing shells being eliminated.
Figure 3:
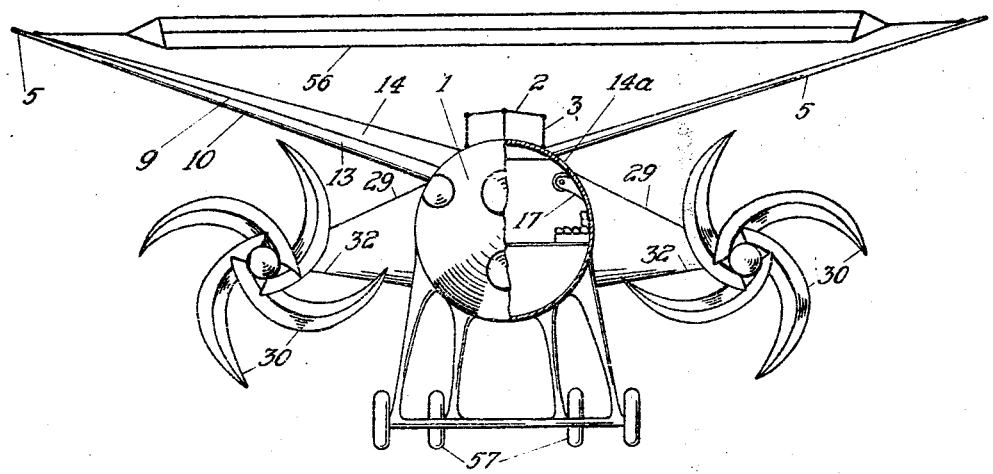
Fig. 3 is a front end view, partly in section.
Figure 4:
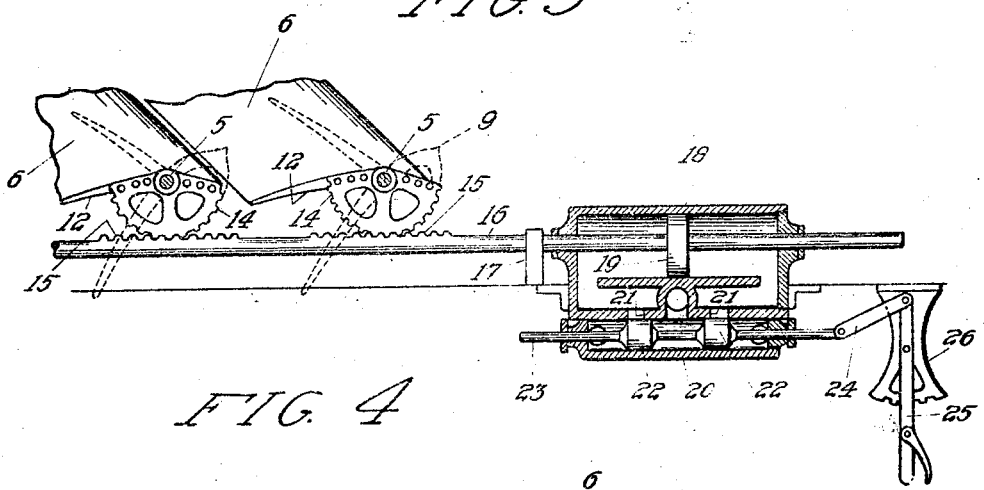
Fig. 4 is an enlarged fragmentary sectional view illustrating the compressed air machine control.
Figure 5:
Fig. 5 is a perspective view of one of the wings.

The machine as a unit is of streamline design, the body, the wings in assembly, the tail planes and propellers are all harmonious in design thus greatly facilitating the movement of the machine through the air, permitting it to travel with a minimum expenditure of fuel, with greater safety and with the minimum wear and tear on the moving parts.

The interior of the machine is most modern in its appointments, it is electric lighted throughout, heated, provided with hot and cold shower baths, lavatories, a radio compartment, ample baggage and storage room and with every other convenience and sanitary equipment necessary or desirable for long flights.

The machine, further, comprises elevating and stabilizing mechanism whereby flights at practically any desired altitude may be had as well as mechanism for facilitating a quick descent in perfect safety when desired, exceptional facilities are provided for easy steering, turning, righting, jockeying in unfavorable air strata, etc. The propellers are so arranged and controlled that when not in motion they will not interfere with soaring, descending, settling or forward movement of the machine.

The construction, design and arrangement of the wings and tail planes is such that three air cutting edges for each shell are provided, the shells of the wings being adjustable upon supporting ribs. The hollow tapered wings and tail planes are water tight so that the machine will be floated should it be precipitated into a body of water. The wings and tail planes extend above and rearwardly of the body of the machine and are adjustably arranged upon stationary ribs and are adjustable through the medium of compressed air while the machine is in motion. Upon each side of the machine and beneath the wings thereof are streamline propellers, the speed of said propellers being independent, one or the other thus affording the machine great flexibility of movement. The wing or tail planes are constructed with a long wide concave undersurface, a long narrow portion extending along the front inner side and of concave formation and meeting the concave undersurface in a front edge, thus providing a construction adapted to grip or embrace the air currents. This arrangement gives the machine great stability and enables it to ride the air gracefully, to settle and land readily and at the same time to be driven through the air with a minimum power, enables the machine to utilize its momentum to the greatest advantage when the motors are shut off, and when the propellers are running and driving currents of air beneath the wings to move forward at maximum speed and with great ease and grace.

The reference numeral 1 denotes the body of the machine which is cigar shaped in general outline, the upper side of the body comprising the deck and being provided with a deck rail 2 carried by the supports 3 laterally of which and extending longitudinally of said body are the flanges 4 of the stationary tubular tapered ribs 5 which are attached to said body and upon which the wings 6 and tail planes 7 are movably arranged, each wing or tail plane being formed with a longitudinally extending cavity 8 to receive said rib and each of said wings and tail planes comprising a forward cutting edge 9, a lateral cutting edge 10 and a rear cutting edge 11, said members also comprising the bottom concave surface 12, and the forward convex surface 13.

The said wings and tail planes are connected to the body of the machine and gear segments 14 are fastened to the wings 6 and loose upon the ribs 5 and in mesh with the teeth 15 of the serrated piston rods 16 arranged in bearings 17 carried by the body 1, said piston rods extending through the air cylinders 18 of the machine and being provided with pistons 19; said gear segments working through perforations 14ª in the body 1. Integral with or operatively connected to the air cylinders 18 are the valve chambers 20 having the ports 21 common with said cylinders 18, said ports being opened and closed by the valves 22 arranged upon the stems 23 that extend through the said chambers 20 and are connected by links 24 to the operating hand lever 25 fulcrumed to the rack 26 in easy reach of the operator in the compartment 27 who takes position upon a seat 28. By movement of the lever 25 to open one of the ports 21 the rod 16 will be moved in one direction thus causing the wings 6 to separate; when the other port 21 is opened the movement of the piston and wings will be reversed.

Connected to the body 1 by brackets 29 are the propellers 30 which are connected by gears 31 to the shaft 32 which is driven by the motor 33. In the forward end of the body 1 are fuel tanks 34 supplied with fuel from the pumps 35 to drive the motor 33 and the dynamo 36 for the lights used for interior illumination, for the search light 37 and for the interior heating apparatus 38. A compressed air motor 39 supplies air for the compressed air tank 40, said tank being operatively connected to the valve chamber 20 to supply air for operation of the mechanism therein. A water pump 41 is provided in the forward end of the body for supplying water to the large tank 42 at the stern end for the lavatories 43 and shower 44 and for drinking purposes. A receiving tank 45 for waste water is provided and same has a discharge pipe 46 for use when the aeroplane is in a suitable location for the emptying of this tank.

In the various parts of the ship are the stair ladders 47 that lead from one compartment to another while sliding doors 48 also serve to connect adjoining compartments, hatch windows 49 are provided together with windows 50 for passenger compartments, lounging chairs 51, front windows 52. The ship is provided with the ship anchor 53 carried by chain 54 that winds upon the drum 55 to permit the anchor to be cast or drawn up. Radio equipment 56 is provided for receiving or sending messages. The machine is supported, when on the ground, by the wheels 57.

With the machine upon the ground it is started by starting the motors, after the anchor has been raised, this causes the propellers to rotate and the machine is driven over the ground. When good momentum is attained the control levers 25 are moved forward to cause movement of the piston 16 forward which will incline the wings and tail planes to offer the minimum wind resistance, the propellers then driving the plane rapidly upward and forward. To descend a reverse movement of the control levers will spread the wings and tail planes and permit the machine to coast to the ground, or by means of the steering mechanism it can be caused to circle and gradually descend, said steering mechanism comprising independent movement of the propellers and manipulation of the tail planes.

What is claimed is:—

1. In an aeroplane, a streamline perforate cigar-shaped body, supporting wheels for said body, tapered tubular ribs terminally secured to opposite sides of said body, wings and tail planes adjustably arranged upon said ribs, manually controlled pistons arranged within said body and formed with serrations, gear segments fast to said wings and extending into the perforate portions of said body in mesh with said pistons, streamline propellers arranged upon opposite sides of said body, and motors operatively associated with said propellers.

2. In an aeroplane, a streamline perforate cigar-shaped body, supporting wheels for said body, tapered tubular ribs terminally secured to opposite sides of said body and extend upwardly and rearwardly therefrom, streamline wings and tail planes adjustable upon said ribs, manually controlled serrated pistons arranged within said body for movement longitudinally thereof, gear segments secured to the inner ends of said wings and tail planes and extending into the perforate portions of said body in mesh with the serrations of said pistons, streamline propellers arranged upon opposite sides of said body at the forward end thereof and beneath said wings, and motors operatively associated with said propellers.

In testimony that I claim the foregoing as my own I have hereto affixed my signature.

WILLIAM G. G. WEIDINGER.